United States Patent
Lu et al.

(10) Patent No.: US 9,722,845 B2
(45) Date of Patent: Aug. 1, 2017

(54) BLUETOOTH LOW ENERGY FREQUENCY OFFSET AND MODULATION INDEX ESTIMATION

(71) Applicant: Intel IP Corporation, Santa Clara, CA (US)

(72) Inventors: Lu Lu, San Jose, CA (US); Jinyong Lee, Fremont, CA (US); Xuan Steven Li, Cupertino, CA (US); Aiguo Yan, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/757,821

(22) Filed: Dec. 23, 2015

(65) Prior Publication Data
US 2017/0187562 A1    Jun. 29, 2017

(51) Int. Cl.
| | |
|---|---|
| *H04L 27/22* | (2006.01) |
| *H04L 27/26* | (2006.01) |
| *H04L 27/32* | (2006.01) |
| *H04B 17/20* | (2015.01) |
| *H04W 4/00* | (2009.01) |

(52) U.S. Cl.
CPC ......... *H04L 27/2649* (2013.01); *H04B 17/20* (2015.01); *H04L 27/32* (2013.01); *H04W 4/008* (2013.01)

(58) Field of Classification Search
CPC ......... H04L 2027/0065; H04L 27/0014; H04L 1/0054; H04L 27/233; H04L 27/22
See application file for complete search history.

(56) References Cited

U.S. PATENT DOCUMENTS

| | | | |
|---|---|---|---|
| 7,809,083 B1 | 10/2010 | Wu et al. | |
| 8,959,419 B1* | 2/2015 | Sethi | H04L 1/0054 |
| | | | 714/795 |
| 9,276,704 B1* | 3/2016 | Arditti Ilitzky | H04L 27/227 |
| 2005/0089113 A1* | 4/2005 | Seidl | H04L 25/03076 |
| | | | 375/271 |
| 2006/0270355 A1 | 11/2006 | Mak et al. | |
| 2012/0140806 A1* | 6/2012 | Turner | G01R 23/02 |
| | | | 375/224 |
| 2013/0195229 A1* | 8/2013 | Cheng | H04L 27/0014 |
| | | | 375/343 |
| 2015/0280951 A1* | 10/2015 | Shin | H04L 27/14 |
| | | | 375/334 |
| 2016/0323128 A1* | 11/2016 | Qiu | H04L 27/14 |

OTHER PUBLICATIONS

Communication dated May 16, 2017 enclosing Extended European Search Report for European Application No. 16198462.0.
J. Masuch, et al. "A 190-muW Zero*IF GFSK Demodulator with a 4-b Phase-Domain ADC", IEEE Journal of Solid-State Circuits, vol. 47, No. 11 Nov. 2012, pp. 2796-2806.

* cited by examiner

*Primary Examiner* — Aristocratis Fotakis
(74) *Attorney, Agent, or Firm* — Schiff Hardin LLP

(57) ABSTRACT

A Bluetooth Low Energy (BLE) device, having a demodulator configured to translate in-phase and quadrature components of a received BLE signal into a differential phase signal; an estimator configured to estimate a frequency offset of the differential phase signal; and a detector configured to detect information in the differential phase signal corrected by the estimated frequency offset.

9 Claims, 3 Drawing Sheets

BLE Packet Format

FOE & MINDE Block

FOE & MINDE Unit Signal Table for Access Address

BLUETOOTH LOW ENERGY FREQUENCY OFFSET AND MODULATION INDEX ESTIMATION

TECHNICAL FIELD

The present disclosure generally relates to Bluetooth Low Energy (BLE) devices, and more specifically, to BLE devices with frequency offset and modulation index estimation.

BACKGROUND

Bluetooth Low Energy (BLE) is a wireless personal area network technology that, when compared with Regular Bluetooth, provides reduced power consumption and cost while maintaining a similar communication range. In BLE devices, a detector has a significant impact on performance. Traditional BLE devices have a Differential Frequency Estimator (DFE) detector, which detects a received signal in the frequency domain.

DESCRIPTION OF THE ASPECTS

The present disclosure is directed to a Bluetooth Low Energy (BLE) device having a demodulator configured to translate in-phase and quadrature components of a received BLE signal into a differential phase signal, an estimator configured to estimate a frequency offset of the differential phase signal, and a detector configured to detect information in the differential phase signal corrected by the estimated frequency offset.

The BLE device performance is improved when the received BLE signal is translated into the In-phase/Quadrature (IQ) domain, and frequency offset and modulation index estimation and correction is performed so that the data detection may be performed by a detector that is a Maximum Likelihood Sequence Detector (MLSD).

Figure 1:
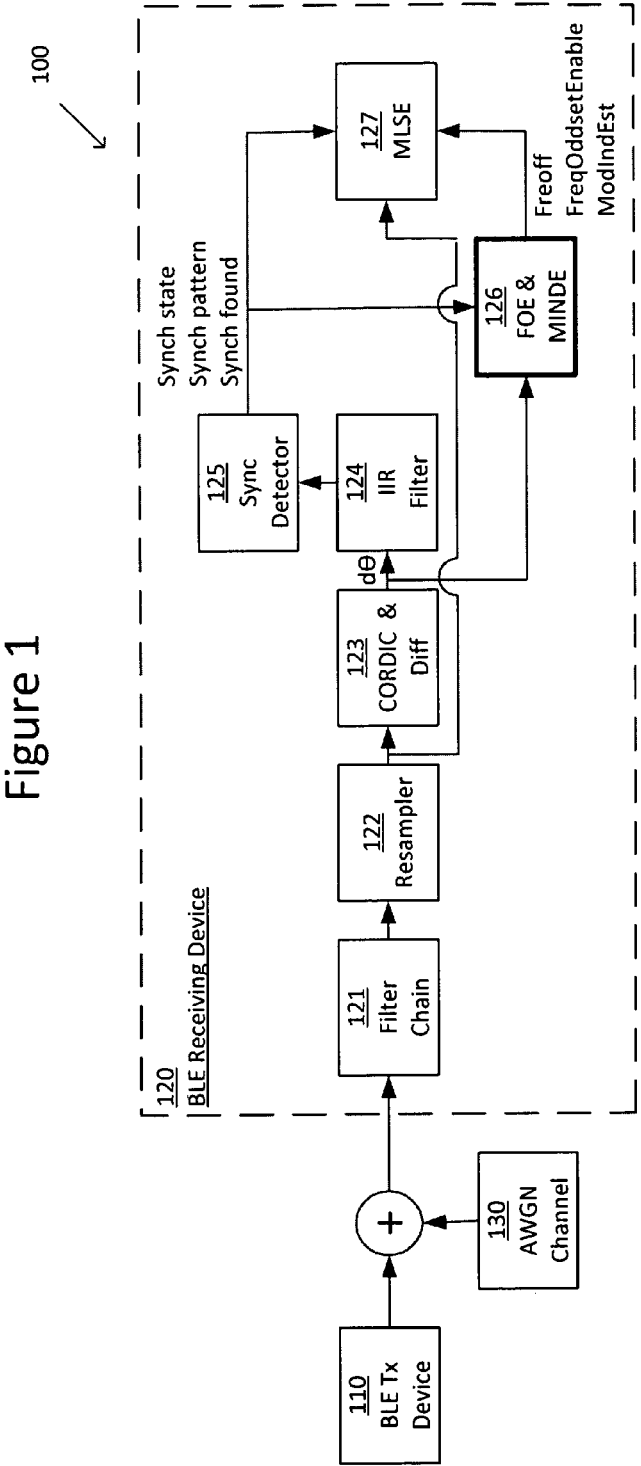
FIG. 1 illustrates a Bluetooth Low Energy system in accordance with the disclosure.

FIG. 1 illustrates a Bluetooth Low Energy (BLE) system 100 in accordance with the disclosure.

The BLE system 100 comprises a BLE transmitting device 110 and a BLE receiving device 120. The BLE transmitter 110 is configured to transmit to the BLE receiver 120 a BLE signal that passes through an Additive White Gaussian Noise (AWGN) channel 130.

The BLE receiving device 120 comprises a receiver (not shown), a filter chain 121, a resampler 122, CORDIC and differentiator unit 123, an Infinite Impulse Response (IIR) filter 124, a synchronization detector 125, a Frequency Offset Estimation and Modulation INDex Estimation (FOE & MINDE) unit 126, and an Maximum Likelihood Sequence Estimator (MLSE) 127.

The filter chain 121 comprises a series of filters. The filter chain 121 is configured to, after receiving the BLE signal with modulated data from the BLE transmitter 110, pre-process the received BLE signal for downsampling, In-phase/Quadrature (IQ) imbalance compensation, group delay equalization, and amplitude equalization.

The resampler 122 is configured to sample the filtered data signal having in-phase and quadrature components to IQ data, which is required by the downstream components. A number of times a symbol is sampled is design specific. This disclosure discusses sampling a symbol thirteen times, but the disclosure is not limited in this respect.

The CORDIC and differentiator unit 123 is a demodulator and comprises a CORDIC and a differentiator. The CORDIC (COordinate Rotation DIgital Computer) is configured to obtain from the IQ data a phase signal. The differentiator is configured to generate from the phase signal a differential phase signal $d\theta$.

The Infinite Impulse Response (IIR) filter 124 is configured to, in the frequency domain, remove a frequency offset $f_{off}$ from a BLE packet's preamble and access address portions. The BLE packet format is discussed below with respect to FIG. 2.

The synchronization detector 125 is configured to detect an access address of a BLE packet using a synchronization pattern. For every frame, the differential data signal $d\theta$ stores in a 32*13 length First-In-First-Out (FIFO) buffer (not shown) data until synchronization is found, and a "Sync Found" flag signal is set. Then the data in the differential phase signal $d\theta$ left in the FIFO buffer is correlated with an access address "Synch Pattern." "Synch State" is a status signal indicating that a block should be started.

The Frequency Offset Estimation and Modulation INDex Estimation (FOE & MINDE) unit 126 is configured to estimate a frequency offset $f_{off}$ of the differential phase signal $d\theta$. FOE & MINDE unit 126 may also be configured to estimate a modulation index $\eta$ of the differential phase signal $d\theta$.

The Maximum Likelihood Sequence Estimator (MLSE) 127 is a detector configured to detect information in the differential phase signal $d\theta$ corrected by the estimated frequency offset $f_{off}$. The MLSE 127 may also be configured to detect information in the differential phase signal $d\theta$ using the estimated modulation index $\eta$.

Figure 2:
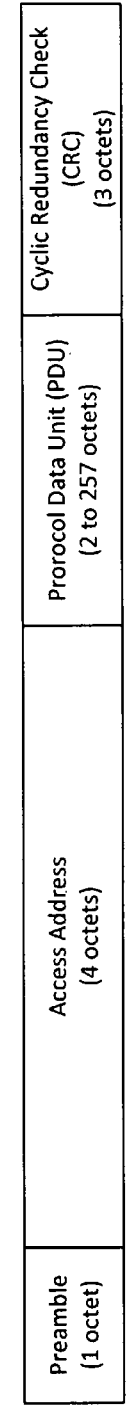
FIG. 2 illustrates a BLE packet format.

FIG. 2 illustrates a BLE packet format 200. A BLE packet comprises a preamble, an access address, a Protocol Data Unit (PDU) and a Cyclic Redundancy Check (CRC). The preamble is a fixed sequence of bits. The access address identifies the BLE connection to which the BLE packet belongs. The PDU is information added or removed by a layer of the Open Systems Interconnection (OSI) model. The CRC is an error-detecting code used to detect accidental changes to raw data.

For a BLE device, the access address has a random pattern. In Bluetooth Regular, on the other hand, the access address has at its end a fixed 1010 pattern. The known 1010 pattern used to estimate frequency offset in Bluetooth Regular systems is not available for BLE.

Figure 3:
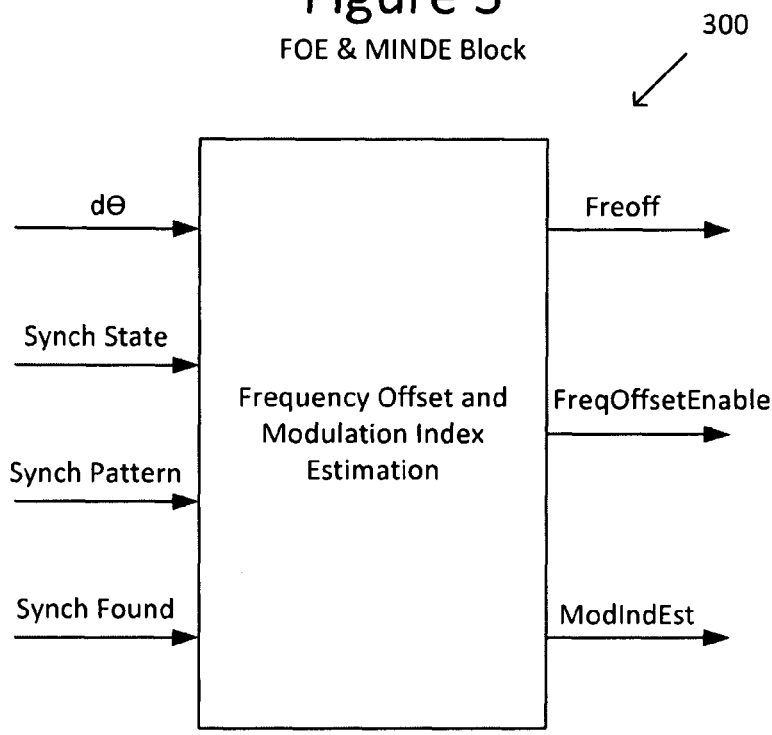
FIG. 3 illustrates input and output signals of a FOE and MINDE unit in accordance with the disclosure.

FIG. 3 illustrates input and output signals of the FOE and MINDE unit 300 in accordance with the disclosure. The FOE and MINDE unit 300 corresponds with the FOE and MINDE unit 126 of FIG. 1.

The FOE and MINDE unit 300 is configured to estimate the frequency offset. This unit 300 can also be configured to estimate the modulation index at the same time the frequency offset is estimated.

The FOE and MINDE unit 300 uses the differential phase signal dθ of the BLE packet's access address to estimate the frequency offset Freoff and modulation index ModIndEst. The access address in BLE has 32 symbols, and is variable. Every symbol is sampled, for example, thirteen times, though the disclosure is not limited in this respect. "FreqOffsetEnable" represents a signal indicating that the frequency offset estimation Freoff can be used.

The frequency offset $f_{off}$ and modulation index η may be estimated in accordance with the following algorithm.

In a first step, a system model in the frequency domain is established in accordance with the following Equation 1:

$$d\Theta_k = 2f_{off} \cdot dt + \eta \cdot \sum_{l=k-19}^{l=k+19} b_l \cdot g(t - 1 \cdot dt) + w_k \quad \text{(Equation 1)}$$

where $d\Theta_k$ is the differential phase signal, $f_{off}$ is the frequency offset, η is the modulation index, $b_l$ is the data sequence, g is the Gaussian pulse, k is an index, and $w_k$ is the noise. If there were no noise, the two sides of Equation 1 would be equal. The data sequence $b_k$, the Gaussian pulse g, and the difference phase signal $d\Theta_k$ are known, so the $$\sum_{l=k-19}^{l=k+19} b_l \cdot g(t - 1 \cdot dt)$$

portion of Equation 1 may be calculated in advance.

Equation 1 represents the transmitted signal from the BLE transmitting device 110. When the differential phase signal is transmitted, the Gaussian pulse g is used to convolve with the data $B_l$, and multiplied with the modulation index η. The frequency offset $f_{off}$ multiplied with delta time dt is then added.

The access address has 32 symbols, and each symbol has 13 samples, so there are 416 samples for the total access address in the sample domain. Index k is thus 0 to 415. The frequency offset $f_{off}$ and the modulation index η are constant throughout the 416 samples. There are thus 416 equations that must be solved. 32 being the symbols is based on a standard protocol, but the number of samples per symbol is design specific.

In a second step, Equation 1 may be represented in a simpler way in accordance with the following Equation 2:

$$C_k = \sum_{l=k-19}^{l=k+19} b_l \cdot g(t - 1 \cdot dt) \quad \text{(Equation 2)}$$

which represents the coefficients $C_k$ that can be precalculated with 416 equations, because its portions are known. Equations 1 and 2 relate to one another in accordance with the following Equation 3:

$$d\Theta_k = 2f_{off} \cdot dt + C_k \cdot \eta \quad \text{(Equation 3)}$$

In a third step, the differential phase signal $d\Theta_k$ and coefficients $C_k$ are known, and then the equations may be solved sub-index k times 416 (32×13=416) to obtain the estimated frequency offset $f_{off}$ and modulation index η.

Each data sequence $b_k$ is either +1 or −1 in bipolar representation. There are 416 equations. Each of the differential phase signals having a bipolar representation $b_k$=+1 are summed, and each of the differential phase signals having a bipolar representation $b_k$=−1 are summed. The result is, instead of 416 equations, only two equations, which are solved to obtain the estimated frequency offset $\hat{f}_{off}$ and the modulation index η.

More specifically, to solve the two equations, $d\Theta_k$(k=1 . . . m), which has $b_k$=1, is summed, and $d\Theta_k$(k=1 . . . n), which has $b_k$=−1 is summed, to obtain the following positive and negative Equations 4 and 5:

$$\varepsilon_M = \sum_{m=1}^{M} d\Theta_m = M \cdot 2\pi f_{off} \cdot dt + \sum_{m=1}^{M} C_m \cdot \eta \quad \text{(Equation 4)}$$

$(b_m = 1, m = 1 \ldots M)$, and $$\varepsilon_N = \sum_{n=1}^{N} d\Theta_n = N \cdot 2\pi f_{off} \cdot dt - \sum_{n=1}^{N} C_n \cdot \eta \quad \text{(Equation 5)}$$

$(b_n = 1, n = 1 \ldots N)$.

As a fourth step, the following calculation is performed in accordance with Equation 6:

$$\alpha = \frac{\sum_{m=1}^{M} C_m}{\sum_{n=1}^{N} C_n}. \quad \text{(Equation 6)}$$

As a fifth step, solving Equations 4 and 5 above, the estimated frequency offset $\hat{f}_{off}$ and modulation index $\hat{\eta}$ are obtained in accordance with the following respective Equations 7 and 8:

$$\hat{f}_{off} = \frac{\varepsilon_M + \alpha \cdot \varepsilon_N}{2 \cdot dt \cdot (M + \alpha \cdot N)}, \text{ and} \quad \text{(Equation 7)}$$

$$\hat{\eta} = \frac{\varepsilon_M + \varepsilon_N - (M + N) \cdot 2\hat{f}_{off} \cdot dt}{\sum_{m=1}^{M} C_m - \sum_{n=1}^{N} C_n}. \quad \text{(Equation 8)}$$

Figure 4:
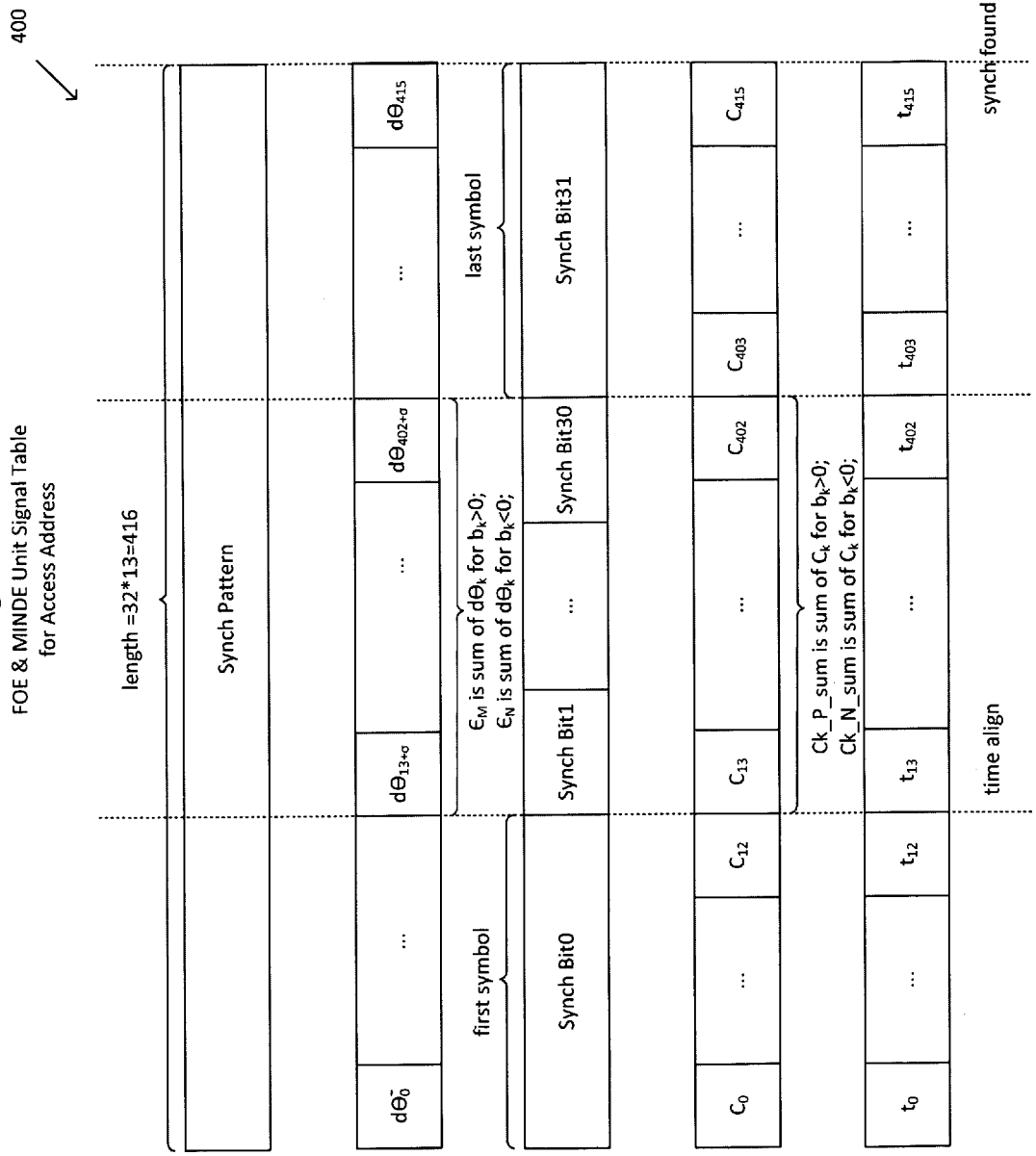
FIG. 4 is a Frequency Offset Estimation and Modulation INDex Estimation (FOE & MINDE) unit signal table in accordance with a hardware implementation used as an example in accordance with the disclosure.

FIG. 4 is a Frequency Offset Estimation and Modulation INDex Estimation (FOE & MINDE) unit signal table for the access address 400 in accordance with an example hardware implementation as follows.

First, a 416-length FIFO buffer is configured to buffer data of an input differential phase signal $d\Theta_k$(k=0, . . . 415) until synchronization is found (Synch Found).

Second, $C_k$(k=12, . . . 402) is calculated based on a lookup table. $C_k, \ldots C_{k+12}$ is decided based on previous, current and next synchronization symbols.

Third, $d\Theta_k$(k=13, . . . 402+σ) which are aligned to $C_k$(k=13, . . . , 402) is chosen.

Fourth, M1, $\varepsilon_M$, and Ck_P_accum (sum of $C_k$), which are correlated to positive $b_k$ are calculated. Also, N1, $\varepsilon_N$, and Ck_N_accum (sum of $C_k$), which are correlated to negative $b_k$ are calculated.

Finally, the estimated frequency offset $\hat{f}_{off}$ and the estimated modulation index $\hat{\eta}$ are calculated as follows:

$$\hat{f}_{\textit{off}} = 4 \cdot \frac{\text{abs}(Ck\_N\_\text{accum}) \cdot \varepsilon_M + Ck\_\text{Paccum} \cdot \varepsilon_N}{\text{abs}(Ck\_N\_\text{accum}) \cdot M1 + Ck\_P\_\text{accum} \cdot N1} + \text{bias}, \quad \text{(Equation 9)}$$

and $$\hat{\eta} = \frac{1}{2} \cdot \left( \frac{13 \cdot (\varepsilon_M - M1 \cdot \hat{f}_{\textit{off}})}{\sum_{m=1}^{M} C_m} + \frac{13 \cdot (\varepsilon_N - N1 \cdot \hat{f})_{\textit{off}}}{\sum_{n=1}^{N} C_n} \right), \quad \text{(Equation 10)}$$

where $$M1 = \frac{M}{13} \text{ and } N1 = \frac{N}{13}.$$

Figure 5:
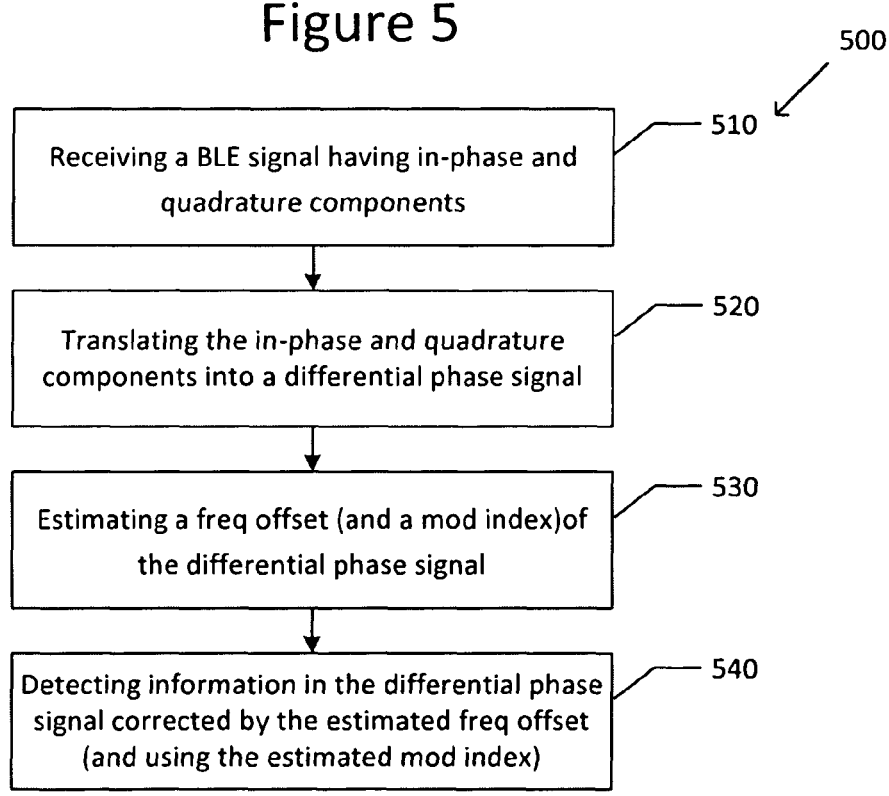
FIG. 5 illustrates a flowchart of a method in accordance with the disclosure.

FIG. 5 illustrates a flowchart 500 of a method in accordance with the disclosure.

In Step 510, a BLE signal having in-phase and quadrature components is received.

In Step 520, the in-phase and quadrature components are translated into a differential phase signal.

In Step 530, a frequency offset of the differential phase signal is estimated. Optionally, a modulation index of the differential phase signal is estimated.

In Step 540, information in the differential phase signal corrected by the estimated frequency offset is detected. Optionally, the information in the differential phase signal is detected using the estimated modulation index.

Example 1 is a Bluetooth Low Energy (BLE) device, comprising a demodulator configured to translate in-phase and quadrature components of a received BLE signal into a differential phase signal; an estimator configured to estimate a frequency offset of the differential phase signal; and a detector configured to detect information in the differential phase signal corrected by the estimated frequency offset.

In Example 2, the subject matter of Example 1, wherein the estimator is further configured to estimate a modulation index of the differential phase signal, and the detector is further configured to detect information in the differential phase signal using the estimated modulation index.

In Example 3, the subject matter of Example 1, wherein the demodulator comprises a COordinate Rotation DIgital Computer (CORDIC) configured to obtain from the in-phase and quadrature components of the received BLE signal a phase signal, and a differentiator unit configured to generate from the phase signal the differential phase signal.

In Example 4, the subject matter of Example 1, wherein the detector is a Maximum Likelihood Sequence Detector (MLSD).

Example 5 is a Bluetooth Low Energy (BLE) system, comprising a first BLE device, which is the BLE device of the subject matter of Example 1, and a second BLE device communicating with the first BLE device.

Example 6 is a Bluetooth Low Energy (BLE) method, comprising translating, by a demodulator, in-phase and quadrature components of a received BLE signal into a differential phase signal, estimating, by an estimator, a frequency offset of the differential phase signal, and detecting, by a detector, information in the differential phase signal corrected by the estimated frequency offset.

In Example 7, the subject matter of Example 6, further comprising estimating, by the estimator, a modulation index of the differential phase signal, and detecting, by the detector, the information in the differential phase signal using the estimated modulation index.

In Example 8, the subject matter of Example 6, further comprising buffering the differential phase signal until synchronization is found.

In Example 9, the subject matter of Example 6, wherein the differential phase signal is represented as $$d\Theta_k = 2f_{\textit{off}} \cdot dt + \eta \cdot \sum_{l=k-19}^{l=k+19} b_l \cdot g(t - 1 \cdot dt) + w_k,$$

where $d\Theta_k$ is the differential phase signal, $f_{\textit{off}}$ is the frequency offset, $\eta$ is the modulation index, $b_l$ is the data sequence, g(t) is the Gaussian pulse, k is an index, and $w_k$ is the noise, and the estimating the frequency offset comprises calculating coefficients $C_k$ in accordance with the following equation $$C_k = \sum_{l=k-19}^{l=k+19} b_l \cdot g(t - 1 \cdot dt),$$

where $d\Theta_k = 2f_{\textit{off}} \cdot dt + C_k \cdot \eta$, summing the differential phase signals which have data sequences $b_k$ positively aligned, and summing the differential phase signals that have data sequences $b_k$ negatively aligned, to obtain the following positive and negative equations $$\varepsilon_M = \sum_{m=1}^{M} d\Theta_m = M \cdot 2\pi f_{\textit{off}} \cdot dt + \sum_{m=1}^{M} C_m \cdot \eta,$$

where $b_m = 1, m = 1 \ldots M$, and, $$\varepsilon_N = \sum_{n=1}^{N} d\Theta_n = N \cdot 2\pi f_{\textit{off}} \cdot dt + \sum_{n=1}^{N} C_n \cdot \eta,$$

where $b_n = 1, n = 1 \ldots N$, calculating $\alpha$ in accordance with the following equation $$\alpha = \frac{\sum_{m=1}^{M} C_m}{\sum_{n=1}^{N} C_n},$$

and calculating the frequency offset in accordance with the following equation $$\hat{f}_{\textit{off}} = \frac{\varepsilon_M + \alpha \cdot \varepsilon_N}{2 \cdot dt \cdot (M + \alpha \cdot N)}.$$

In Example 10, the subject matter of Example 9, wherein estimating a modulation index of the differential phase signal comprises calculating the modulation index in accordance with the following equation:

$$\hat{\eta} = \frac{\varepsilon_M + \varepsilon_N - (M+N) \cdot 2\hat{f}_{off} \cdot dt}{\sum_{m=1}^{M} C_m - \sum_{n=1}^{N} C_n},$$

and further comprising detecting, by the detector, the information in the differential phase signal using the estimated modulation index.

Example 11 is a computer program product embodied on a non-transitory computer-readable medium comprising program instructions configured such that when executed by processing circuitry cause the processing circuitry to implement the method of the subject matter of Example 6.

Example 12 is a Bluetooth Low Energy (BLE) device, comprising a demodulating means for translating in-phase and quadrature components of a received BLE signal into a differential phase signal; an estimating means for estimating a frequency offset of the differential phase signal; and a detecting means for detecting information in the differential phase signal corrected by the estimated frequency offset.

In Example 13 the subject matter of Example 12, wherein the estimating means is further for estimating a modulation index of the differential phase signal, and the detecting means is further for detecting information in the differential phase signal using the estimated modulation index.

In Example 14, the subject matter of Example 12, wherein the demodulating means comprises a COordinate Rotation Digital Computer (CORDIC) means for obtaining from the in-phase and quadrature components of the received BLE signal a phase signal and a differentiator means for generating from the phase signal the differential phase signal.

In Example 15, the subject matter of any of Examples 12-14, wherein the detector is a Maximum Likelihood Sequence Detector (MLSD).

Example 16 is a Bluetooth Low Energy (BLE) system, comprising a first BLE device, which is the BLE device of any of any of Examples 12-14, and a second BLE device communicating with the first BLE device.

Example 17 is a Bluetooth Low Energy (BLE) method, comprising translating, by a demodulating means, in-phase and quadrature components of a received BLE signal into a differential phase signal; estimating, by an estimating means, a frequency offset of the differential phase signal; and detecting, by a detecting means, information in the differential phase signal corrected by the estimated frequency offset.

In Example 18, the subject matter of Example 17, further comprising estimating, by the estimating means, a modulation index of the differential phase signal, and detecting, by the detecting means, the information in the differential phase signal using the estimated modulation index.

In Example 19, the subject matter of Example 17, further comprising buffering the differential phase signal until synchronization is found.

In Example 20, the subject matter of any of Examples 17-19, wherein the differential phase signal is represented as $$d\Theta_k = 2f_{off} \cdot dt + \eta \cdot \sum_{l=k-19}^{l=k+19} b_l \cdot g(t - 1 \cdot dt) + w_k,$$

where $d\Theta_k$ is the differential phase signal, $f_{off}$ is the frequency offset, $\eta$ is the modulation index, $b_l$ is the data sequence, $g(t)$ is the Gaussian pulse, k is an index, and $w_k$ is the noise, and the estimating the frequency offset comprises calculating coefficients $C_k$ in accordance with the following equation $$C_k = \sum_{l=k-19}^{l=k+19} b_l \cdot g(t - 1 \cdot dt),$$

where $d\Theta_k = 2f_{off} \cdot dt + C_k \cdot \eta$, summing the differential phase signals which have data sequences $b_k$ positively aligned, and summing the differential phase signals that have data sequences $b_k$ negatively aligned, to obtain the following positive and negative equations $$\varepsilon_M = \sum_{m=1}^{M} d\Theta_m = M \cdot 2\pi f_{off} \cdot dt + \sum_{m=1}^{M} C_m \cdot \eta,$$

where $b_m = 1, m = 1 \ldots M$, and $$\varepsilon_N = \sum_{n=1}^{N} d\Theta_n = N \cdot 2\pi f_{off} \cdot dt + \sum_{n=1}^{N} C_n \cdot \eta,$$

where $b_n = 1, n = 1 \ldots N$, calculating $\alpha$ in accordance with the following equation $$\alpha = \frac{\sum_{m=1}^{M} C_m}{\sum_{n=1}^{N} C_n},$$

and calculating the frequency offset in accordance with the following equation $$\hat{f}_{off} = \frac{\varepsilon_M + \alpha \cdot \varepsilon_N}{2 \cdot dt \cdot (M + \alpha \cdot N)}.$$

In Example 21, the subject matter of any of Examples 17-19 wherein estimating a modulation index of the differential phase signal comprises calculating the modulation index in accordance with the following equation $$\hat{\eta} = \frac{\varepsilon_M + \varepsilon_N - (M+N) \cdot 2\hat{f}_{off} \cdot dt}{\sum_{m=1}^{M} C_m - \sum_{n=1}^{N} C_n},$$

and further comprising detecting, by the detector, the information in the differential phase signal using the estimated modulation index.

Example 22 is a computer program product embodied on a non-transitory computer-readable medium comprising program instructions configured such that when executed by processing circuitry cause the processing circuitry to implement the subject matter of any of Examples 17-19.

Example 23 is an apparatus as shown and described.

Example 24 is a method as shown and described.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A Bluetooth Low Energy (BLE) device, comprising:
   a demodulator configured to translate in-phase and quadrature components of a received BLE signal into a differential phase signal;
   an estimator configured to estimate a frequency offset of the differential phase signal, and configured to estimate a modulation index of the differential phase signal; and
   a detector configured to detect information in the differential phase signal corrected by the estimated frequency offset using the estimated modulation index,
   wherein
   the differential phase signal is represented as $$d\Theta_k = 2f_{off} \cdot dt + \eta \cdot \sum_{l=k-19}^{l=k+19} b_l \cdot g(t - l \cdot dt) + w_k,$$

where $d\Theta_k$ is the differential phase signal, $f_{off}$ is the frequency offset, $\eta$ is the modulation index, $b_l$ is the data sequence, $g(t)$ is the Gaussian pulse, k is an index, and $w_k$ is the noise, and
   the estimating the frequency offset comprises:
      calculating coefficients $C_k$ in accordance with the following equation:

$$C_k = \sum_{l=k-19}^{l=k+19} b_l \cdot g(t - l \cdot dt),$$

where $d\Theta_k = 2f_{off} \cdot dt + C_k \cdot \eta$,
   summing differential phase signals which have data sequences $b_k$ positively aligned, and summing differential phase signals that have data sequences $b_k$ negatively aligned, to obtain the following positive and negative equations, respectively:

$$\varepsilon_M = \sum_{m=1}^{M} d\Theta_m = M \cdot 2\pi f_{off} \cdot dt + \sum_{m=1}^{M} C_m \cdot \eta,$$

where $b_m = 1, m = 1 \ldots M$, and $$\varepsilon_N = \sum_{n=1}^{N} d\Theta_n = N \cdot 2\pi f_{off} \cdot dt + \sum_{n=1}^{N} C_n \cdot \eta,$$

where $b_n = 1, n = 1 \ldots N$,
   calculating α in accordance with the following equation:

$$\alpha = \frac{\sum_{m=1}^{M} C_m}{\sum_{n=1}^{N} C_n},$$

and
   calculating the frequency offset in accordance with the following equation:

$$\hat{f}_{off} = \frac{\varepsilon_M + \alpha \cdot \varepsilon_N}{2 \cdot dt \cdot (M + \alpha \cdot N)}.$$

2. The BLE device of claim 1, wherein the demodulator comprises:
   a COordinate Rotation DIgital Computer (CORDIC) configured to obtain from the in-phase and quadrature components of the received BLE signal a phase signal; and
   a differentiator configured to generate from the phase signal the differential phase signal.

3. The BLE device of claim 1, wherein the detector is a Maximum Likelihood Sequence Detector (MLSD).

4. A Bluetooth Low Energy (BLE) system, comprising:
   a first BLE device, which is the BLE device of claim 1; and
   a second BLE device communicating with the first BLE device.

5. The BLE device of claim 1,
   wherein estimating a modulation index of the differential phase signal comprises calculating the modulation index in accordance with the following equation:

$$\hat{\eta} = \frac{\varepsilon_M + \varepsilon_N - (M + N) \cdot 2\hat{f}_{off} \cdot dt}{\sum_{m=1}^{M} C_m - \sum_{n=1}^{N} C_n}.$$

6. A Bluetooth Low Energy (BLE) method, comprising:
   translating, by a demodulator, in-phase and quadrature components of a received BLE signal into a differential phase signal;
   estimating, by an estimator, a frequency offset of the differential phase signal;
   estimating, by the estimator, a modulation index of the differential phase signal; and
   detecting, by a detector, information in the differential phase signal corrected by the estimated frequency offset using the estimated modulation index,
   wherein
   the differential phase signal is represented as $$d\Theta_k = 2f_{off} \cdot dt + \eta \cdot \sum_{l=k-19}^{l=k+19} b_l \cdot g(t - l \cdot dt) + w_k,$$

where $d\Theta_k$ is the differential phase signal, $f_{off}$ is the frequency offset, $\eta$ is the modulation index, $b_l$ is the data sequence, $g(t)$ is the Gaussian pulse, k is an index, and $w_k$ is the noise, and the estimating the frequency offset comprises:
calculating coefficients $C_k$ in accordance with the following equation:

$$C_k = \sum_{l=k-19}^{l=k+19} b_l \cdot g(t - 1 \cdot dt),$$

where $d\Theta_k = 2f_{off} \cdot dt + C_k \cdot \eta$,
summing differential phase signals which have data sequences $b_k$ positively aligned, and summing differential phase signals that have data sequences $b_k$ negatively aligned, to obtain the following positive and negative equations, respectively:

$$\varepsilon_M = \sum_{m=1}^{M} d\Theta_m = M \cdot 2\pi f_{off} \cdot dt + \sum_{m=1}^{M} C_m \cdot \eta,$$

where $b_m = 1, m = 1 \ldots M$, and $$\varepsilon_N = \sum_{n=1}^{N} d\Theta_n = N \cdot 2\pi f_{off} \cdot dt + \sum_{n=1}^{N} C_n \cdot \eta,$$

where $b_n = 1, n = 1 \ldots N$,
calculating $\alpha$ in accordance with the following equation:

$$\alpha = \frac{\sum_{m=1}^{M} C_m}{\sum_{n=1}^{N} C_n},$$

and
calculating the frequency offset in accordance with the following equation:

$$\hat{f}_{off} = \frac{\varepsilon_M + \alpha \cdot \varepsilon_N}{2 \cdot dt \cdot (M + \alpha \cdot N)}.$$

7. The BLE method of claim 6, further comprising buffering the differential phase signal until synchronization is found.

8. The BLE method of claim 6,
wherein estimating a modulation index of the differential phase signal comprises calculating the modulation index in accordance with the following equation:

$$\hat{\eta} = \frac{\varepsilon_M + \varepsilon_N - (M + N) \cdot 2\hat{f}_{off} \cdot dt}{\sum_{m=1}^{M} C_m - \sum_{n=1}^{N} C_n},$$

and
further comprising detecting, by the detector, the information in the differential phase signal using the estimated modulation index.

9. A computer program product embodied on a non-transitory computer-readable medium comprising program instructions configured such that when executed by processing circuitry cause the processing circuitry to implement the method of claim 6.

\* \* \* \* \*

UNITED STATES PATENT AND TRADEMARK OFFICE
CERTIFICATE OF CORRECTION

PATENT NO. : 9,722,845 B2
APPLICATION NO. : 14/757821
DATED : August 1, 2017
INVENTOR(S) : Lu Lu et al.

Page 1 of 1

It is certified that error appears in the above-identified patent and that said Letters Patent is hereby corrected as shown below:

In the Specification

At Column 7, Line number 62, please delete " $d\Theta_k = 2f_{off} \cdot dt + \eta \cdot \sum_{l=k-19}^{l=k+19} b_l \cdot g(t - 1 \cdot dt) + w_k$ "

and insert -- $d\Theta_k = 2f_{off} \cdot dt + \eta \cdot \sum_{l=k-19}^{l=k+19} b_l \cdot g(t - \ell \cdot dt) + w_k$ --, therefor.

In the Claims

At Column 9, Claim number 1, Line 29, please delete " $d\Theta_k = 2f_{off} \cdot dt + \eta \cdot \sum_{l=k-19}^{l=k+19} b_l \cdot g(t - 1 \cdot dt) + w_k$ "

and insert -- $d\Theta_k = 2f_{off} \cdot dt + \eta \cdot \sum_{l=k-19}^{l=k+19} b_l \cdot g(t - \ell \cdot dt) + w_k$ --, therefor.

Signed and Sealed this
Fourteenth Day of November, 2017

Joseph Matal
*Performing the Functions and Duties of the
Under Secretary of Commerce for Intellectual Property and
Director of the United States Patent and Trademark Office*